(12) United States Patent
Zhao et al.

(10) Patent No.: US 10,075,883 B2
(45) Date of Patent: Sep. 11, 2018

(54) METHOD AND DEVICE FOR NOTIFYING GROUP COMMUNICATION INFORMATION

(71) Applicant: China Academy of Telecommunications Technology, Beijing (CN)

(72) Inventors: Yali Zhao, Beijing (CN); Huiying Zhang, Beijing (CN); Jianhua Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/033,257

(22) PCT Filed: Oct. 28, 2014

(86) PCT No.: PCT/CN2014/089680
§ 371 (c)(1),
(2) Date: Apr. 29, 2016

(87) PCT Pub. No.: WO2015/062474
PCT Pub. Date: May 7, 2015

(65) Prior Publication Data
US 2016/0286439 A1    Sep. 29, 2016

(30) Foreign Application Priority Data

Oct. 30, 2013 (CN) .......................... 2013 1 0527009

(51) Int. Cl.
*H04W 36/00* (2009.01)
*H04W 4/08* (2009.01)
(Continued)

(52) U.S. Cl.
CPC ....... *H04W 36/0061* (2013.01); *H04L 12/189* (2013.01); *H04W 4/08* (2013.01);
(Continued)

(58) Field of Classification Search
CPC .......................... H04L 12/189; H04W 36/0061; H04W 36/30; H04W 4/08; H04W 72/1226; H04W 72/20
See application file for complete search history.

(56) References Cited

U.S. PATENT DOCUMENTS 9,497,731 B2 * 11/2016 Shindo ................ H04W 72/005
2005/0213541 A1 * 9/2005 Jung ........................ H04W 4/06
370/331
(Continued)

FOREIGN PATENT DOCUMENTS

CN          101873532 A      10/2010
CN          102136863 A       7/2011
(Continued)

OTHER PUBLICATIONS

Taiwanese Office Action for Taiwanese Patent Application No. 10520172840, 9 pages.
(Continued)

*Primary Examiner* — Dung B. Huynh
(74) *Attorney, Agent, or Firm* — Morgan Lewis & Bockius LLP

(57) ABSTRACT

The present disclosure provides a method and a device for notifying group communication information. The method may include: exchanging, by a base station, with a further base station information about MBSFN areas to which serving cells of the base stations belong; and transmitting, by the base station, information about MBSFN areas to which neighboring cells of a current serving cell of a terminal belong, to the terminal in accordance with the neighboring cells of the current serving cell of the terminal and received information about the MBSFN area, the terminal being served by the current serving cell. According to the present disclosure, it is able to notify the group communication
(Continued)

information on the basis of an MBMS network architecture, thereby to ensure the service continuity for the group communication.

14 Claims, 5 Drawing Sheets

(51) Int. Cl.
*H04L 12/18* (2006.01)
*H04W 36/30* (2009.01)
*H04W 92/20* (2009.01)
*H04W 76/10* (2018.01)

(52) U.S. Cl.
CPC ............ *H04W 36/30* (2013.01); *H04W 76/10* (2018.02); *H04W 92/20* (2013.01)

(56) References Cited

U.S. PATENT DOCUMENTS

| | | | |
|---|---|---|---|
| 2008/0287129 A1* | 11/2008 | Somasundaram | H04W 36/0055 455/436 |
| 2009/0046617 A1 | 2/2009 | Tenny et al. | |
| 2009/0067386 A1* | 3/2009 | Kitazoe | H04J 11/0069 370/332 |
| 2009/0141838 A1* | 6/2009 | Han | H04W 36/06 375/344 |
| 2009/0156225 A1* | 6/2009 | Angelow | H04J 11/0093 455/450 |
| 2009/0203376 A1 | 8/2009 | Sambhwani et al. | |
| 2009/0252182 A1 | 10/2009 | Maheshwari et al. | |
| 2010/0165905 A1* | 7/2010 | Kanazawa | H04W 72/005 370/312 |
| 2010/0189027 A1* | 7/2010 | Ishida | H04W 48/12 370/312 |
| 2010/0195622 A1* | 8/2010 | Buchmayer | H04W 72/005 370/332 |
| 2010/0232340 A1* | 9/2010 | Godor | H04H 20/57 370/312 |
| 2010/0315963 A1* | 12/2010 | Jading | H04J 11/0093 370/252 |
| 2011/0149827 A1* | 6/2011 | Na | H04L 12/189 370/312 |
| 2011/0164548 A1* | 7/2011 | Kim | H04W 16/32 370/312 |
| 2011/0305183 A1* | 12/2011 | Hsu | H04W 72/005 370/312 |
| 2011/0305184 A1* | 12/2011 | Hsu | H04L 65/4076 370/312 |
| 2012/0039237 A1 | 2/2012 | Liang et al. | |
| 2012/0172028 A1* | 7/2012 | Korus | H04W 60/00 455/422.1 |
| 2012/0236776 A1* | 9/2012 | Zhang | H04W 48/12 370/312 |
| 2013/0028161 A1* | 1/2013 | Maeda | H04L 5/0048 370/311 |
| 2013/0039250 A1 | 2/2013 | Hsu | |
| 2013/0051298 A1* | 2/2013 | Drevo | H04W 36/0083 370/312 |
| 2013/0058234 A1* | 3/2013 | Yang | H04L 27/261 370/252 |
| 2013/0128765 A1* | 5/2013 | Yang | H04W 24/00 370/252 |
| 2013/0229974 A1* | 9/2013 | Xu | H04W 4/06 370/312 |
| 2013/0301509 A1* | 11/2013 | Purnadi | H04L 65/4076 370/312 |
| 2013/0336173 A1* | 12/2013 | Mandil | H04W 36/0072 370/280 |
| 2014/0036676 A1* | 2/2014 | Purnadi | H04W 36/0055 370/235 |
| 2014/0098734 A1* | 4/2014 | Kalhan | H04W 4/06 370/312 |
| 2014/0112236 A1* | 4/2014 | Jung | H04W 76/002 370/312 |
| 2014/0148145 A1* | 5/2014 | Jung | H04W 24/10 455/418 |
| 2014/0153474 A1* | 6/2014 | Zhao | H04W 36/0083 370/312 |
| 2014/0269566 A1 | 9/2014 | Wang et al. | |
| 2014/0293859 A1 | 10/2014 | Liang et al. | |
| 2015/0124682 A1* | 5/2015 | Phan | H04W 4/06 370/312 |
| 2015/0208379 A1* | 7/2015 | Lin | H04W 4/06 370/312 |
| 2015/0223126 A1* | 8/2015 | Jung | H04W 36/04 455/444 |
| 2016/0323846 A1* | 11/2016 | Park | H04W 4/08 |

FOREIGN PATENT DOCUMENTS

| | | |
|---|---|---|
| CN | 102202265 A | 9/2011 |
| CN | 102857867 A | 1/2013 |
| CN | 102938878 A | 2/2013 |
| CN | 103313202 A | 9/2013 |
| CN | 102857867 B | 6/2015 |
| TW | I374644 B | 10/2012 |
| TW | I376971 B | 11/2012 |
| TW | I380643 B | 12/2012 |

OTHER PUBLICATIONS

Chinese First Office Action dated Aug. 1, 2017, for CN Patent Application No. 201310527009.3, 21 pages.
European Telecommunications Standards Institute (ETSI), "LTE; Evolved Universal Terrestrial Radio Access Network (E-UTRAN); X2 Application Protocol (X2AP) (3GPP TS 36.423 version 11.6.0 Release 11)," Sep. 1, 2013, vol. 3GPP RAN 3, No. V11.6.1, 144 pages.
Extended European Search Report dated Oct. 18, 2016, for EP Patent Application No. 14857645.7, 10 pages.
International Search Report and Written Opinion dated Jan. 26, 2015, for PCT Application No. PCT/CN2014/089680, 14 pages.
European Communication pursuant to Article 94(3) EPC dated Jul. 25, 2017, for EP Application No. 14857645.7, 4 pages.

* cited by examiner

METHOD AND DEVICE FOR NOTIFYING GROUP COMMUNICATION INFORMATION

CROSS-REFERENCE TO RELATED APPLICATION

The present application is a U.S. National Phase of International Application No. PCT/CN2014/089680 filed Oct. 28, 2014, which claims priority to Chinese patent application No. 201310527009.3 filed on Oct. 30, 2013, which are incorporated herein by reference in their entirety.

TECHNICAL FIELD

The present disclosure relates to the field of communication technology, in particular to a method and a device for notifying group communication information.

BACKGROUND

Group communication refers to the data transmission to all terminals in a group simultaneously via a network in a rapid and effective manner. For a Long-Term Evolution (LTE) system, an end-to-end transmission delay for the group communication is required to be 150 ms. In order to meet the requirement on the transmission delay, it is currently inclined to reuse an existing Multimedia Broadcast Multicast Service (MBMS) architecture, with some modifications, as a network architecture.

FIG. 1 shows the MBMS network architecture for the LTE system. Logical entities in the MBMS network architecture mainly include a Mobility Management Entity (MME), an MBMS Gateway (GW), a Multi-cell/multicast Coordination Entity (MCE), an evolved Node B (eNB), a Packet Data Network Gateway (P-GW), and a Broadcast Multicast Service Center (BM-SC). An M3 interface is used to provide functions related to session management between the MME and the MCE, an M2 interface is used to provide functions, such as session management and MBMS scheduling information transmission, between the MCE and the eNB, and an M1 interface is used to provide MBMS service transmission between the MBMS GW and the eNB.

Depending on different roles for the group communication, the terminals for the group communication may be divided into two kinds, i.e., transmission terminals and reception terminals. The transmission terminal refers to a terminal which is authorized by a group communication server to transmit group communication data to the group communication server, and uplink data is transmitted in a unicast manner between the transmission terminal and the group communication server. On the other hand, the reception terminal refers to a terminal which is authorized by the group communication server to receive the group communication data issued thereby, and the group communication data may be received by the reception terminal via a network in a unicast or multicast manner.

Currently, there is an urgent need to support public safety group communication using the LTE system. One scheme is to achieve the group communication function using the existing MBMS network architecture. However, there is no scheme for notifying information related to the group communication, so as to meet the requirements of the group communication on service continuity when the terminals move into different Multicast Broadcast Single Frequency Network (MBSFN) areas or move out of the MBSFN areas.

SUMMARY

An object of the present disclosure is to provide a method and a device for notifying group communication information, so as to notify the group communication information on the basis of an MBMS network architecture, thereby to ensure the service continuity for the group communication.

In one aspect, the present disclosure provides in certain embodiments a method for notifying group communication information, including steps of: exchanging, by a base station, with a further base station information about MBSFN areas to which serving cells of the base stations belong; and transmitting, by the base station, information about MBSFN areas to which neighboring cells of a current serving cell of a terminal belong, to the terminal in accordance with the neighboring cells of the current serving cell of the terminal and received information about the MBSFN area, the terminal being served by the current serving cell.

Alternatively, the step of exchanging, by the base station, with the further base station the information about the MBSFN areas to which the serving cells of the base stations belong may include: exchanging, by the base station, with the further base station the information about the MBSFN areas to which the serving cells of the base stations belong, by an X2 Setup Request message; or exchanging, by the base station, with the further base station the information about the MBSFN areas to which the serving cells of the base stations belong, by an X2 Setup Response message; or exchanging, by the base station, with the further base station the information about the MBSFN areas to which the serving cells of the base stations belong, by an eNB Configuration Update message.

Alternatively, the step of transmitting, by the base station, the information about the MBSFN areas to which the neighboring cells of the current serving cell of the terminal belong, to the terminal in accordance with the neighboring cells of the current serving cell of the terminal and the received information about the MBSFN area may include: transmitting, by the base station, the information about the MBSFN areas to which the neighboring cells of the current serving cell of the terminal belong, to the terminal when the base station determines, in accordance with the neighboring cells of the current serving cell of the terminal and the received information about the MBSFN area, that the MBSFN areas to which the neighboring cells of the current serving cell of the terminal belong are different from the MBSFN area to which the current serving cell of the terminal belongs.

Alternatively, the step of transmitting, by the base station, the information about the MBSFN areas to which the neighboring cells of the current serving cell of the terminal belong, to the terminal in accordance with the neighboring cells of the current serving cell of the terminal and the received information about the MBSFN area may include: determining, by the base station, whether or not the terminal is interested in a group communication service or whether or not the terminal is executing the group communication service after the information about the MBSFN areas has been received, and when the base station determines that the terminal is interested in the group communication service or the terminal is executing the group communication service, transmitting, by the base station, the information about the MBSFN areas to which the neighboring cells of the current serving cell of the terminal belong, to the terminal via dedicated signaling. The dedicated signaling may include Radio Resource Control (RRC) signaling, Media Access Control (MAC) signaling or L1 signaling. Alternatively, the step of transmitting, by the base station, the information about the MBSFN areas to which the neighboring cells of the current serving cell of the terminal belong, to the terminal in accordance with the neighboring cells of the current serving cell of the terminal and the received information about the MBSFN areas may include: determining, by the base station, whether or not there is a terminal in the current serving cell that is interested in a group communication service or that is executing the group communication service after the information about the MBSFN area has been received, and when the base station determines that there is a terminal in the current serving cell that is interested in the group communication service or that is executing the group communication service, transmitting the information about the MBSFN areas to which the neighboring cells of the current serving cell of the terminal belong, to the terminal by broadcasting at the current serving cell the information about the MBSFN areas.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In another aspect, the present disclosure provides in certain embodiments a method for notifying group communication information, including steps of: receiving, by a terminal, information about MBSFN areas to which neighboring cells of a current serving cell of the terminal belong from a base station; and determining, by the terminal, whether or not target serving cells of the terminal belong to the MBSFN area identical to the current serving cell in accordance with the received information about the MBSFN areas.

Alternatively, the step of determining, by the terminal, whether or not the target serving cells of the terminal belong to the MBSFN area identical to the current serving cell may include: when the terminal enters the current serving cell, determining whether or not the target serving cells belong to the MBSFN area identical to the current serving cell, the target serving cells being all neighboring cells of the current serving cell; or when signal strength of the current serving cell of the terminal is lower than that of the neighboring cells, determining whether or not the target serving cells belong to the MBSFN area identical to the current serving cell, the target serving cells being the neighboring cells that meet a cell switch or reselection condition, or previous N neighboring cells in the neighboring cells that meet the cell switch or reselection condition when ranked in a descending order in accordance with the signal strength, where $N \geq 1$; or when signal quality of the current serving cell of the terminal is less than a first threshold or signal quality of the neighboring cells is greater than a second threshold, determining whether or not the target serving cells belong to the MBSFN area identical to the current serving cell, the target serving cells being the neighboring cells that meet the cell switch or reselection condition, or previous N neighboring cells in the neighboring cells that meet the cell switch or reselection condition when ranked in a descending order in accordance with the signal quality, where $N \geq 1$.

Alternatively, when the terminal determines that the target serving cells of the terminal belong to the MBSFN areas different from the current serving cell, the method may further include: acquiring, by the terminal, system information about the target serving cells, and acquiring information desired for creating a unicast bearer or an MBMS bearer for the target serving cells in accordance with the system information about the target serving cells.

Alternatively, the step of acquiring, by the terminal, the system information about the target serving cells, and acquiring the information desired for creating a unicast bearer or an MBMS bearer for the target serving cells in accordance with the system information about the target serving cells may include: acquiring, by the terminal, the system information about the target serving cells, acquiring multicast control channel information in the system information, and determining whether or not there is a group communication service in which the terminal is interested or which is being executed by the terminal in the MBSFN areas to which the target serving cells belong; when there is the group communication service in which the terminal is interested or which is being executed by the terminal, storing the system information about the target serving cells and the multicast control channel information, the system information and the multicast control channel information being used to receive data in an MBMS manner when the terminal is switched or reselected to the target serving cell; or when there is not the group communication service in which the terminal is interested or which is being executed by the terminal, creating the unicast bearer for the current serving cell, or creating the unicast bearer for the target serving cell in accordance with the system information about the target serving cell.

Alternatively, when the terminal determines that the target serving cells of the terminal belong to the MBSFN areas different from the current serving cell, the method may further include: creating, by the terminal, the unicast bearer for the current serving cell so as to be switched to the target serving cell in a unicast manner.

Alternatively, after the terminal is switched to the target serving cell, the method may further include: determining, by the terminal, whether or not the group communication service in which the terminal is interested is provided by the target serving cell in an MBMS manner in accordance with the system information about the target serving cell and the multicast control channel information, and when the group communication service in which the terminal is interested is provided by the target serving cell in an MBMS manner, receiving the group communication service at the target serving cell in an MBMS manner, and releasing the unicast bearer for the target serving cell.

Alternatively, the step of receiving, by the terminal, the information about the MBSFN areas to which the neighboring cells of the current serving cell of the terminal belong from the base station may include: receiving, by the terminal, the information about the MBSFN areas to which the neighboring cells of the current serving cell of the terminal belong from the base station by receiving broadcasting information at the current serving cell or by receiving dedicated signaling.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In yet another aspect, the present disclosure provides in certain embodiments a base station, including: a first interface module configured to exchange with a further base station information about MBSFN areas to which serving cells of the base stations belong; and a second interface module configured to transmit information about MBSFN areas to which neighboring cells of a current serving cell of a terminal belong, to the terminal in accordance with the neighboring cells of the current serving cell of the terminal and received information about the MBSFN area, the terminal being served by the current serving cell.

Alternatively, the first interface module may be configured to exchange with the further base station the information about the MBSFN areas to which the serving cells of the base stations belong, by an X2 Setup Request message; or exchange with the further base station the information about the MBSFN area to which the serving cells of the base stations belong, by an X2 Setup Response message; or exchange with the further base station the information about the MBSFN areas to which the serving cells of the base stations belong, by an eNB Configuration Update message.

Alternatively, the base station may further include a first processing module configured to determine, in accordance with the neighboring cells of the current serving cell of the terminal and the received information about the MBSFN area, whether or not the MBSFN areas to which the neighboring cells of the current serving cell of the terminal belong are different from the MBSFN area to which the current serving cell of the terminal belongs. The second interface module may be configured to, when the MBSFN areas to which the neighboring cells of the current serving cell of the terminal belong are different from the MBSFN area to which the current serving cell of the terminal belongs, transmit the information about the MBSFN areas to which the neighboring cells of the current serving cell of the terminal belong, to the terminal.

Alternatively, the base station may further include a second processing module configured to determine whether or not the terminal is interested in a group communication service or whether or not the terminal is executing the group communication service after the information about the MBSFN areas has been received by the first interface module, and the second interface module may be configured to, when the terminal is interested in the group communication service or the terminal is executing the group communication service, transmit the information about the MBSFN areas to which the neighboring cells of the current serving cell of the terminal belong, to the terminal via dedicated signaling. The dedicated signaling includes RRC signaling, MAC signaling or L1 signaling.

Alternatively, the base station may further include a third processing processor configured to determine whether or not there is a terminal in the current serving cell that is interested in a group communication service or that is executing the group communication service after the information about the MBSFN area has been received, and the second interface module may be configured to, when there is a terminal in the current serving cell that is interested in the group communication service or that is executing the group communication service, broadcast at the current serving cell the information about the MBSFN areas to which the neighboring cells of the current serving cell of the terminal belong.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In still yet another aspect, the present disclosure provides in certain embodiments a base station, including: a processor, a transceiver and a memory. The processor is configured to read a program stored in the memory so as to exchange with a further base station information about MBSFN areas to which serving cells of the base stations belong, and transmit information about MBSFN areas to which neighboring cells of the current serving cell of the terminal, to the terminal via the transceiver in accordance with the neighboring cells of the current serving cell of the terminal and the information about the MBSFN area received by a first interface module, the terminal being served by the current serving cell. The transceiver is configured to receive and transmit data under the control of the processor. The memory is configured to store data desired for the operation of the processor.

Alternatively, the processor may be configured to read the program stored in the memory, so as to exchange with the further base station the information about the MBSFN areas to which the serving cells of the base stations belong, by an X2 Setup Request message; or exchange with the further base station the information about the MBSFN areas to which the serving cells of the base stations belong, by an X2 Setup Response message; or exchange with the further base station the information about the MBSFN areas to which the serving cells of the base stations belong, by an eNB Configuration Update message.

Alternatively, the processor may be further configured to read the program stored in the memory, so as to determine, in accordance with the neighboring cells of the current serving cell of the terminal and the received information about the MBSFN area, whether or not the MBSFN areas to which the neighboring cells of the current serving cell of the terminal belong are different from the MBSFN area to which the current serving cell of the terminal belongs, and when the MBSFN areas to which the neighboring cells of the current serving cell of the terminal belong are different from the MBSFN area to which the current serving cell of the terminal belongs, transmit the information about the MBSFN areas to which the neighboring cells of the current serving cell of the terminal belong, to the terminal.

Alternatively, the processor may be further configured to read the program stored in the memory, so as to determine whether or not the terminal is interested in a group communication service or whether or not the terminal is executing the group communication service after the information about the MBSFN areas has been received by the first interface module, and when the terminal is interested in the group communication service or the terminal is executing the group communication service, transmit the information about the MBSFN areas to which the neighboring cells of the current serving cell of the terminal belong, to the terminal via dedicated signaling. The dedicated signaling may include RRC signaling, MAC signaling or L1 signaling.

Alternatively, the processor may be further configured to determine whether or not there is a terminal in the current serving cell that is interested in a group communication service or that is executing the group communication service after the information about the MBSFN area has been received, and when there is a terminal in the current serving cell that is interested in the group communication service or that is executing the group communication service, broadcast at the current serving cell the information about the MBSFN areas to which the neighboring cells of the current serving cell of the terminal belong.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In still yet another aspect, the present disclosure provides in certain embodiments a terminal, including: an interface module configured to receive information about MBSFN areas to which neighboring cells of a current serving cell of the terminal belong from a base station; and a determination module configured to determine whether or not target serving cells of the terminal belong to the MBSFN area identical to the current serving cell in accordance with the information about the MBSFN areas received by the interface module.

Alternatively, the determination module may be configured to, when the terminal enters the current serving cell, determine whether or not the target serving cells belong to the MBSFN area identical to the current serving cell, the target serving cells being all neighboring cells of the current serving cell; or when signal strength of the current serving cell of the terminal is lower than those of the neighboring cells, determine whether or not the target serving cells belong to the MBSFN area identical to the current serving cell, the target serving cells being the neighboring cells that meet a cell switch or reselection condition, or previous N neighboring cells in the neighboring cells that meet the cell switch or reselection condition when ranked in a descending order in accordance with the signal strength, where N≥1; or when signal quality of the current serving cell of the terminal is less than a first threshold or signal quality of the neighboring cells is greater than a second threshold, determine whether or not the target serving cells belong to the MBSFN area identical to the current serving cell, the target serving cells being the neighboring cells that meet the cell switch or reselection condition, or previous N neighboring cells in the neighboring cells that meet the cell switch or reselection condition when ranked in a descending order in accordance with the signal quality, where N≥1.

Alternatively, the terminal may further include an acquisition module configured to, when the determination module determines that the target serving cells of the terminal belong to the MBSFN areas different from the current serving cell, acquire system information about the target serving cells, and acquire information desired for creating a unicast bearer or an MBMS bearer for the target serving cells in accordance with the system information about the target serving cells. The acquisition module may be further configured to, after the terminal is switched to the target serving cell, determine whether or not the group communication service in which the terminal is interested is provided by the target serving cell in an MBMS manner in accordance with the system information about the target serving cell and multicast control channel information, and when the group communication service in which the terminal is interested is provided by the target serving cell in an MBMS manner, instruct the bearer processing module to receive the group communication service at the target serving cell in an MBMS manner, and release the unicast bearer for the target serving cell.

Alternatively, the terminal may further include a bearer processing module configured to, when the target serving cells of the terminal belong to the MBSFN areas different from the current serving cell, create the unicast bearer for the current serving cell, and switch the terminal to the target serving cell in a unicast manner.

Alternatively, the terminal may further include a bearer processing module. The acquisition module may be configured to acquire the system information about the target serving cells, acquire multicast control channel information in the system information, and determine whether or not there is a group communication service in which the terminal is interested or which is being executed by the terminal in the MBSFN areas to which the target serving cells belong; when there is the group communication service in which the terminal is interested or which is being executed by the terminal, store the system information about the target serving cells and the multicast control channel information, the system information and the multicast control channel information being used to receive data in an MBMS manner when the terminal is switched or reselected to the target serving cell; or when there is not the group communication service in which the terminal is interested or which is being executed by the terminal, instruct the bearer processing module to create the unicast bearer for the current serving cell, or instruct the bearer processing module to create the unicast bearer for the target serving cell in accordance with the system information about the target serving cell. The interface module may be configured to receive the information about the MBSFN areas to which the neighboring cells of the current serving cell of the terminal belong from the base station by receiving broadcasting information at the current serving cell or by receiving dedicated signaling.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In still yet another aspect, the present disclosure further provides in certain embodiments a terminal, including a processor, a transceiver and a memory. The processor is configured to read a program stored in the memory, so as to receive information about MBSFN areas to which neighboring cells of a current serving cell of the terminal belong from a base station via the transceiver, and determine whether or not target serving cells of the terminal belong to the MBSFN area identical to the current serving cell in accordance with the received information about the MBSFN areas. The transceiver is configured to receive and transmit data under the control of the processor. The memory is configured store data desired for the operation of the processor.

Alternatively, the processor may be configured to read the program stored in the memory, so as to, when the terminal enters the current serving cell, determine whether or not the target serving cells belong to the MBSFN area identical to the current serving cell, the target serving cells being all neighboring cells of the current serving cell; or when signal strength of the current serving cell of the terminal is lower than those of the neighboring cells, determine whether or not the target serving cells belong to the MBSFN area identical to the current serving cell, the target serving cells being the neighboring cells that meet a cell switch or reselection condition, or previous N neighboring cells in the neighboring cells that meet the cell switch or reselection condition when ranked in a descending order in accordance with the signal strength, where N≥1; or when signal quality of the current serving cell of the terminal is less than a first threshold or signal quality of the neighboring cells is greater than a second threshold, determine whether or not the target serving cells belong to the MBSFN area identical to the current serving cell, the target serving cells being the neighboring cells that meet the cell switch or reselection condition, or previous N neighboring cells in the neighboring cells that meet the cell switch or reselection condition when ranked in a descending order in accordance with the signal quality, where N≥1.

Alternatively, the processor may be configured to read the program stored in the memory, so as to, when a determination module determines that the target serving cells of the terminal belong to the MBSFN areas different from the current serving cell, acquire system information about the target serving cells, and acquire information desired for creating a unicast bearer or an MBMS bearer for the target serving cells in accordance with the system information about the target serving cells. The processor may be configured to read the program stored in the memory, so as to, after the terminal is switched to the target serving cell, determine whether or not the group communication service in which the terminal is interested is provided by the target serving cell in an MBMS manner in accordance with the system information about the target serving cell and multicast control channel information, and when the group communication service in which the terminal is interested is provided by the target serving cell in an MBMS manner, instruct a bearer processing module to receive the group communication service at the target serving cell in an MBMS manner, and release the unicast bearer for the target serving cell.

Alternatively, the processor may be configured to read the program stored in the memory, so as to, when the target serving cells of the terminal belong to the MBSFN areas different from the current serving cell, create the unicast bearer for the current serving cell and switch the terminal to the target serving cell in a unicast manner.

Alternatively, the processor may be configured to read the program stored in the memory, so as to, acquire the system information about the target serving cells, acquire multicast control channel information in the system information, and determine whether or not there is a group communication service in which the terminal is interested or which is being executed by the terminal in the MBSFN areas to which the target serving cells belong; and when there is the group communication service in which the terminal is interested or which is being executed by the terminal, store the system information about the target serving cells and the multicast control channel information, the system information and the multicast control channel information being used to receive data in an MBMS manner when the terminal is switched or reselected to the target serving cell; or when there is not the group communication service in which the terminal is interested or which is being executed by the terminal, instruct the bearer processing module to create the unicast bearer for the current serving cell, or instruct the bearer processing module to create the unicast bearer for the target serving cell in accordance with the system information about the target serving cell.

Alternatively, the processor may be configured to read the program stored in the memory, so as to receive the information about the MBSFN areas to which the neighboring cells of the current serving cell of the terminal belong from the base station by receiving broadcasting information at the current serving cell or by receiving dedicated signaling.

Alternatively, the information about the MBSFN areas to which the neighboring cells belong may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

According to the embodiments of the present disclosure, the base station exchanges with a further base station the information about the MBSFN areas to which the serving cells of the base stations belong, and transmits the information about the MBSFN areas to which the neighboring cells of the current serving cell of the terminal belong, to the terminal, so that the terminal may acquire the information about the MBSFN areas to which the neighboring cells of the current serving cell belong before the cell switch or reselection operation. As a result, it is able to create the unicast bearer for the current serving cell or create the unicast bearer or the MBMS service bearer for the target serving cells in advance, thereby to reduce the transmission delay for the group communication service when the terminal moves between the cells, and ensure the continuity of the group communication service.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
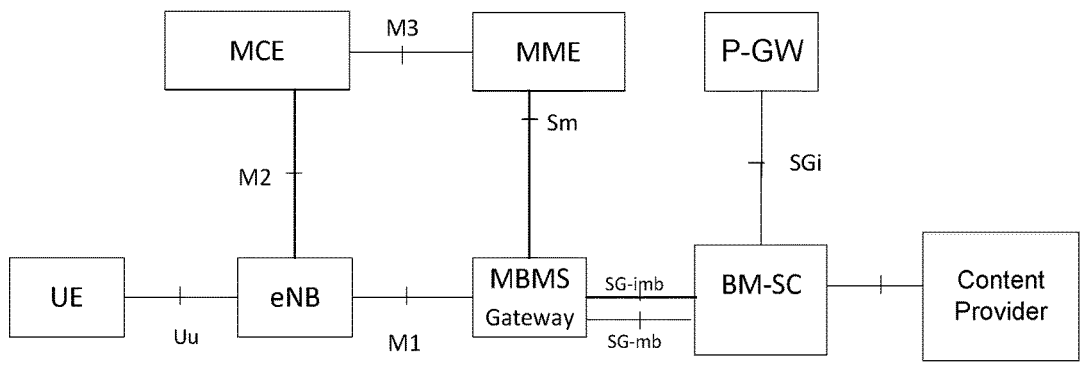
FIG. 1 is a schematic view showing an MBMS network architecture for an existing LTE system.

An existing MBMS network architecture may be used to achieve group communication, but in some scenarios, e.g., when a terminal moves out of an MBSFN area, the terminal will be switched between a multicast connection and a unicast connection or between different multicast connections, or it will reselect the multicast or unicast connection. After the terminal fails to receive an MBMS service at a target serving cell, it will create the unicast connection to the target serving cell or create an MBMS bearer. In this way, the group communication service may be interrupted for a long period of time during the switch between the multicast connection and the unicast connection or the reselection thereof, or during the switch between the multicast connections or the reselection thereof. As a result, it is impossible to meet the requirements of the group communication on service continuity.

In this regard, the present disclosure provides a scheme for notifying the group communication information on the basis of the existing LTE system architecture, so as to reduce the transmission delay for the group communication and ensure the service continuity.

In the embodiments of the present disclosure, a base station may exchange with a further base station information about MBSFN areas to which serving cells of the base stations belong via an X2 interface, and notify a terminal of the information about the MBSFN areas to which neighboring cells of a current serving cell of the terminal served by the base station belong, to the terminal. Further, the terminal may determine, in accordance with the received information about the MBSFN area, whether or not a target serving cell into which the terminal is about to enter belongs to the MBSFN area identical to the current serving cell. When they belong to the identical MBSFN area, the terminal may continue to receive group communication data in an MBMS manner. Otherwise, on the premise that the terminal continues to receive the group communication data in an MBMS manner, the terminal may pre-read system information about the target serving cell, so as to acquire information desired for creating a unicast bearer or the MBMS bearer for the target serving cell.

According to the embodiments of the present disclosure, the terminal may acquire whether or not the switched or reselected target serving cell belongs to the MBSFN area identical to the current serving cell in advance, so as to determine, in a subsequent operation, whether or not to transmit the data in a unicast manner, receive the data in an MBMS manner, or create the MBMS bearer, thereby to reduce the transmission delay for the group communication service when the terminal moves between the cells and ensure the service continuity.

In order to make the objects, the technical solutions and the advantages of the present disclosure more apparent, the present disclosure will be described hereinafter in conjunction with the drawings and embodiments. Obviously, the following embodiments are merely a part of, rather than all of, the embodiments of the present disclosure, and based on these embodiments, a person skilled in the art may obtain, without any creative effort, the other embodiments, which also fall within the scope of the present disclosure.

Figure 2:
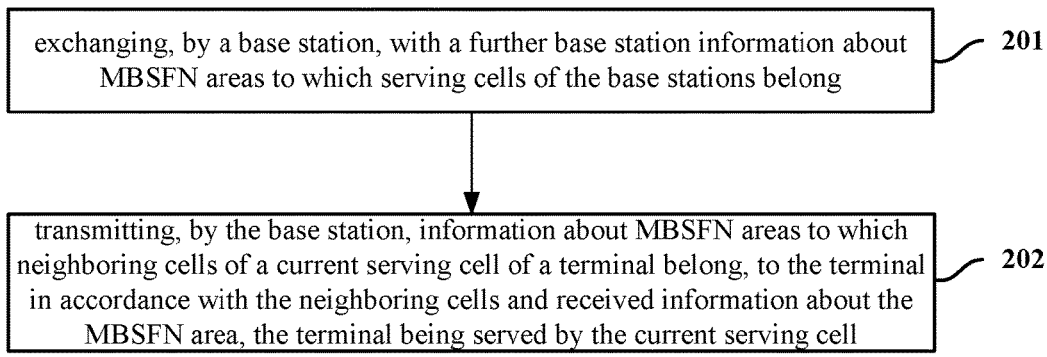
FIG. 2 is a flow chart of a method for notifying group communication information at a base station side according to one embodiment of the present disclosure.

Referring to FIG. 2, which is a flow chart of a method for notifying group communication information at a base station side according to one embodiment of the present disclosure, the method may include: Step 201 of exchanging, by a base station, with a further base station information about MBSFN areas to which serving cells of the base stations belong; and Step 202 of transmitting, by the base station, information about MBSFN areas to which neighboring cells of a current serving cell of a terminal belong, to the terminal in accordance with the neighboring cells of the current serving cell of the terminal and the received information about the MBSFN area, the terminal being served by the current serving cell.

During the implementation, after receiving from the further base station the information about the MBSFN areas to which the serving cells of the further base station belong, the base station may, with respect to each terminal served by the serving cell, determine the information about the MBSFN areas to which the neighboring cells of the current serving cell of the terminal belong, in accordance with the neighboring cells of the current serving cell of the terminal and the received information about the MBSFN area, and transmit the information about the MBSFN areas to which the neighboring cells of the current serving cell of the terminal belong, to the terminal.

In Step 201, the base station may exchange with the further base station the information about the MBSFN areas to which the serving cells of the base stations belong via an X2 interface. During the implementation, the base station may exchange with the further base station the information about the MBSFN areas to which the serving cells of the base stations belong by an X2 Setup Request message, an X2 Setup Response message, or an eNB Configuration Update message.

The X2 interface is an interface between the base stations and it is used to interconnect the base stations. It includes an X2 user plane and an X2 control plane, and the user plane is configured to transmit user data between the base stations. Through the X2 interface, it is able for the base stations to exchange the Served Cell Information. In an existing protocol, the information included in the Served Cell Information exchanged on the basis of the X2 interface and related to MBMS merely includes MBSFN Subframe Information and MBMS Service Area Identity List. Alternatively, in the embodiments of the present disclosure, the Serving Cell Information exchanged on the basis of the X2 interface may be extended, so as to enable it to carry the information about the MBSFN areas to which the serving cells belong. Table 1 shows a format for the extended Serving Cell Information.

TABLE 1

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | | |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in ref. TS 36.104 [16]. | — | — |
| >>>DL EARFCN | M | | EARFCN 9.2.26 | Corresponds to $N_{DL}$ in ref. TS 36.104 [16]. | — | — |
| >>>UL Transmission Bandwidth | M | | Transmission Bandwidth 9.2 27 | | | |
| >>>DL Transmission Bandwidth | M | | Transmission Bandwidth 9.2 27 | Same as UL Transmission Bandwidth in this release. | — | — |
| >TDD | | | | | — | — |
| >>TDD Info | | 1 | | | — | — |
| >>>EARFCN | M | | 9.2.26 | Corresponds to $N_{DL}/N_{UL}$ in ref. TS 36.104 [16]. | — | — |
| >>> Transmission Bandwidth | M | | Transmission Bandwidth 9.2 27 | | | |
| >>>Subframe Assignment | M | | ENUMERATED (sa0, sa1, sa2, sa3, sa4, sa5, sa6, ...) | Uplink-downlink subframe configuration information defined in ref. TS 36.211 [10]. | — | — |
| >>>Special Subframe Info | | 1 | | Special subframe configuration information defined in ref. TS 36.211 [10]. | | |
| >>>>Special Subframe Patterns | M | | ENUMERATED (ssp0, ssp1, ssp2, ssp3, ssp4, ssp5, ssp6, ssp7, ssp8, ..., ssp9) | | — | — |
| >>>>Cyclic Prefix DL | M | | ENUMERATED (Normal, Extended, ...) | | — | — |
| >>>>Cyclic Prefix UL | M | | ENUMERATED (Normal, Extended, ...) | | | |

TABLE 1-continued

| IE/Group Name | Presence | Range | IE type and reference | Semantics description | Criticality | Assigned Criticality |
|---|---|---|---|---|---|---|
| Number of Antenna Ports | O | | 9.2.43 | | YES | ignore |
| PRACH Configuration | O | | PRACH Configuration 9.2.50 | | YES | ignore |
| MBSFN Subframe Info | | 0 ... <maxnoofMBSFN> | | MBSFN subframe defined in TS 36.331 [9]. | GLOBAL | ignore |
| >Radioframe Allocation Period | M | | ENUMERATED (n1, n2, n4, n8, n16, n32, ...) | | — | — |
| >Radioframe Allocation Offset | M | | INTEGER (0 ... 7, ...) | | — | — |
| >Subframe Allocation | M | | 9.2.51 | | — | — |
| CSG Id | O | | 9.2.53 | | YES | ignore |
| MBMS Service Area Identity List | | 0 ... <maxnoofMBMSServiceAreaIdentities> | | Supported MBMS Service Area Identities in the cell. | GLOBAL | ignore |
| >MBMS Service Area Identity | | | OCTET STRING(2) | MBMS Service Area Identities as defined in TS 23.003 [xx]. | | |
| MultibandInfo List | O | | 9.2.60 | | YES | ignore |
| MBSFN area Id | O | | INTEGER (0 ... 255) | | | |

In Table 1, the MBMS Service Area Identity List information element and the MBSFN Subframe Information element related to MBMS are known in the art, and the MBSFN area ID element is newly added in the embodiments of the present disclosure for carrying the information about the MBSFN areas to which the current serving cells of the terminal belong.

It should be appreciated that, Table 1 is merely for illustrative purposes, but shall not be construed as limiting the present disclosure. In addition, the base station may also exchange with a further base station the information about the MBSFN areas to which the serving cells of the base stations belong, by a newly-defined message, or a new information element may be added in the existing message on the basis of the X2 interface interaction so as to carry the information about the MBSFN areas to which the serving cells of the base stations belong.

In Step 202, the information about the MBSFN areas of the neighboring cells transmitted by the base station may include one or a combination of: identifiers of all the neighboring cells, and identifiers of the MBSFN areas to which the neighboring cells belong; identifiers of all the neighboring cells, and indication information corresponding to the identifier of each neighboring cell, the indication information indicating whether or not each neighboring cell belongs to the MBSFN area identical to the current serving cell; identifiers of the neighboring cells which belong to the MBSFN areas different from the current serving cell, and identifiers of the MBSFN areas to which these neighboring cells belong; identifiers of the neighboring cells which belong to the MBSFN areas different from the current serving cell; and identifiers of the neighboring cells which belong to the MBSFN areas identical to the current serving cell.

In Step 202, alternatively, the base station may transmit the information about the MBSFN areas to which the neighboring cells of the current serving cell of the terminal belong, to the terminal when the base station determines, in accordance with the neighboring cells of the current serving cell of the terminal and the received information about the MBSFN area, that the MBSFN areas to which the neighboring cells of the current serving cell of the terminal belong are different from the MBSFN area to which the current serving cell of the terminal belongs. When the MBSFN areas to which the neighboring cells of the current serving cell of the terminal belong are identical to the MBSFN area to which the current serving cell of the terminal belongs, the base station may not transmit the information about the MBSFN areas to which the neighboring cells of the current serving cell of the terminal belong, to the terminal. In this way, it is able to reduce signaling overhead for an air interface.

In Step 202, alternatively, prior to transmitting the information about the MBSFN areas to which the neighboring cells of the current serving cell of the terminal belong, to the terminal, the base station may determine whether or not the terminal is interested in a group communication service or whether or not the terminal is executing the group communication service. Only when the base station determines that the terminal is interested in the group communication service or the terminal is executing the group communication service, the base station may transmit the information about the MBSFN areas to which the neighboring cells of the current serving cell of the terminal belong, to the terminal. The base station may determine whether or not the terminal is interested in the group communication service or whether or not the terminal is executing the group communication service in accordance with MBMS Interest information reported by the terminal. For example, when there is a terminal reporting that it is interested in the MBMS service on a frequency point of the current serving cell, the base station may determine that the terminal is interested in the group communication service. Also, the base station may determine whether or not the terminal is interested in the group communication service or whether or not the terminal is executing the group communication service in accordance with a counting result. For example, when the counting result obtained by the base station with respect to a certain MBMS service is not zero, the base station may determine that there is a terminal that is interested in the MBMS service or that is receiving the MBMS service.

Alternatively, when the base station determines that the terminal is interested in the group communication service or the terminal is executing the group communication service, the base station may transmit the information about the MBSFN areas to which the neighboring cells of the current serving cell of the terminal belong, to the terminal via dedicated signaling (which carries the information about the MBSFN areas to which the neighboring cells of the current serving cell of the terminal belong). The dedicated signaling may be RRC signaling, MAC signaling or L1 signaling.

In Step 202, alternatively, prior to transmitting the information about the MBSFN areas to which the neighboring cells of the current serving cell of the terminal belong, to the terminal, the base station may also determine whether or not whether or not there is a terminal in the current serving cell that is interested in a group communication service or that is executing the group communication service. When the base station determines that there is the terminal in the current serving cell that is interested in the group communication service or that is executing the group communication service, the base station may transmit the information about the MBSFN areas to which the neighboring cells of the current serving cell of the terminal belong, to the terminal by broadcasting at the current serving cell the information about the MBSFN areas. During the implementation, in order to broadcast the information about the MBSFN areas, a newly-defined System Information Block (SIB) may be introduced or an existing SIB may be modified, so as to carry the information about the MBSFN areas.

It should be appreciated that, the above second and third alternative modes for Step 202 may be used in combination with the above first alternative mode for Step 202. To be specific, in the case that the first alternative mode is used in combination with the second alternative mode, when the terminal is interested in the group communication service or it is executing the group communication service but the MBSFN areas to which the neighboring cells of the current serving cell of the terminal belong are different from the MBSFN area to which the current serving cell belongs, the information about the MBSFN areas to which the neighboring cells of the current serving cell belong may be transmitted to the terminal. A condition for the first alternative mode may be determined before or after a condition for the second alternative mode, i.e., the determination order thereof is not particularly defined herein. In the case that the first alternative mode is used in combination with the third alternative mode, when there is a terminal in the current serving cell that is interested in the group communication service or that is executing the group communication service but the MBSFN areas to which the neighboring cells of the current serving cells of the terminal belong are different from the MBSFN area to which the current serving cell belongs, the base station may transmit the information about the MBSFN areas to which the neighboring cells of the current serving cell of the terminal belong, to the terminal. A condition for the first alternative mode may be determined before or after a condition for the third alternative mode, i.e., the determination order thereof is not particularly defined herein.

According to the method in the embodiments of the present disclosure, the base station exchanges with a further base station the information about the MBSFN areas to which the serving cells of the base stations belong, and transmits the information about the MBSFN areas to which the neighboring cells of the current serving cell of the terminal belong, to the terminal, so that the terminal may acquire the information about the MBSFN areas to which the neighboring cells of the current serving cell belong before the cell switch or reselection. As a result, it is able to create the unicast bearer for the current serving cell or create the unicast bearer or the MBMS service bearer for the target serving cells in advance, thereby to reduce the transmission delay for the group communication service when the terminal moves between the cells, and ensure the continuity of the group communication service.

Corresponding processing may be performed by the terminal after it receives from the base station the information about the MBSFN areas to which the neighboring cells of the current serving cell of the terminal belong.

Figure 3:
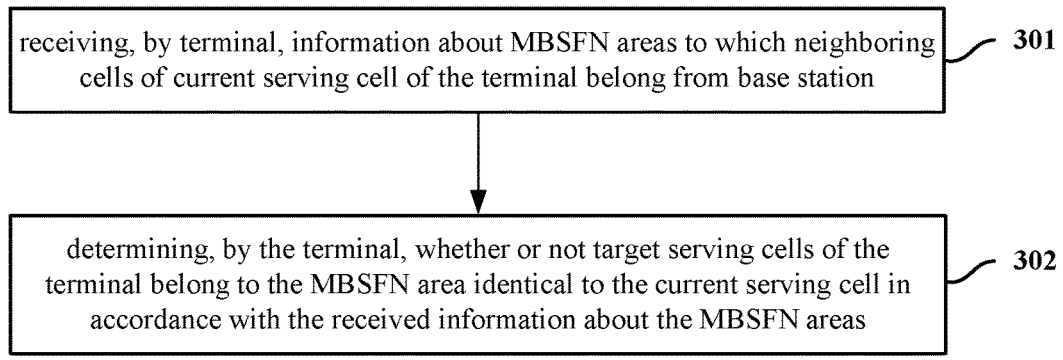
FIG. 3 is a flow chart of a method for notifying group communication information at a terminal side according to one embodiment of the present disclosure.

Referring to FIG. 3, which is a flow chart of a method for notifying group communication information at a terminal side according to one embodiment of the present disclosure, the method may include the following steps.

Step 301: receiving, by a terminal, information about MBSFN areas to which neighboring cells of a current serving cell of the terminal belong from a base station. As mentioned above, the terminal may receive from the base station the information about the MBSFN areas to which the neighboring cells of the current serving cell of the terminal belong by broadcasting or via dedicated signaling. In addition, the contents contained in the information about the MBSFN areas to which the neighboring cells of the current serving cell of the terminal belong are mentioned hereinabove, and thus will not be repeated herein.

Step 302: determining, by the terminal, whether or not target serving cells of the terminal belong to the MBSFN area identical to the current serving cell in accordance with the received information about the MBSFN areas.

In Step 301, there may be various triggering conditions for the terminal to determine whether or not the target serving cells of the terminal belong to the MBSFN area identical to the current serving cell, and some of them will be given hereinafter.

Triggering condition 1: when the terminal enters the current serving cell, the terminal may start to determine whether or not the target serving cells of the terminal belong to the MBSFN area identical to the current serving cell. In this triggering condition, the target serving cells are all the neighboring cells of the current serving cell of the terminal.

Triggering condition 2: when signal strength of the current serving cell of the terminal is lower than those of the neighboring cells, the terminal may start to determine whether or not the target serving cells belong to the MBSFN area identical to the current serving cell. In this triggering condition, the target serving cells are the neighboring cells that meet a cell switch or reselection condition, or previous N (N≥1) neighboring cells in the neighboring cells that meet the cell switch or reselection condition when ranked in a descending order in accordance with the signal strength. A value of N may be set in accordance with the practical need.

For example, in order to reduce a data volume stored in the terminal, N may be set as one (1).

Triggering condition 3: when signal quality of the current serving cell of the terminal is less than a first threshold or signal quality of the neighboring cells is greater than a second threshold, the terminal may start to determine whether or not the target serving cells belong to the MBSFN area identical to the current serving cell. In this triggering condition, the target serving cells are the neighboring cells that meet the cell switch or reselection condition, or previous N (N≥1) neighboring cells in the neighboring cells that meet the cell switch or reselection condition when ranked in a descending order in accordance with the signal quality. The first and second thresholds may be set by the system and configured for the terminal via a network-side device (e.g., a base station). A value of N may be set in accordance with the practical need. For example, in order to reduce a data volume stored in the terminal, N may be set as one (1).

When determination operation is started by the terminal in accordance with the above triggering conditions, it is able to reduce a processing overhead for the terminal. For example, as can be seen from the second or third triggering condition, the determination operation is started only when the terminal needs to be switched or reselected to the target serving cell.

The above triggering conditions are for illustrative purposes only, but shall not be used to limit the scope of the present disclosure. For example, the terminal may perform the determination operation after it receives from the base station the information about the MBSFN areas to which the neighboring cells of the current serving cell of the terminal belong.

In Step 302, when the terminal determines that the target serving cells of the terminal belong to the MBSFN areas different from the current serving cell, the terminal may further acquire system information about the target serving cells, and acquire information desired for creating a unicast bearer or an MBMS bearer for the target serving cells in accordance with the system information about the target serving cells. In this way, it is able for the terminal to pre-create the bearer for the current serving cell or the target serving cell in accordance with the acquired information (i.e., the information desired for creating the unicast bearer or the MBMS bearer for the target serving cells), or to execute the MBMS service as soon as possible in accordance with the information when the terminal is switched or reselected to the target serving cell, thereby to ensure the continuity of the group communication service.

During the implementation, the terminal may acquire the system information about the target serving cells, acquire multicast control channel (MCCH) information in the system information, and determine whether or not there is a group communication service in which the terminal is interested or which is being executed by the terminal in the MBSFN areas to which the target serving cells belong (the determination manner is similar to that mentioned above). When there is the group communication service in which the terminal is interested or which is being executed by the terminal, the terminal may store the system information about the target serving cells and the MCCH information. Otherwise, the terminal may create the unicast bearer for the current serving cell, or create the unicast bearer for the target serving cell in accordance with the system information about the target serving cell. Alternatively, the terminal may create the unicast bearer for the current serving cell, and then it is switched to the target serving cell in a unicast manner. Further, after the terminal is switched to the target serving cell, the terminal may determine whether or not the target serving cell provides the group communication service in which the terminal is interested in an MBMS manner in accordance with the system information of the target serving cell and the MCCH information. When it is determined that the target serving cell provides the group communication service in which the terminal is interested in an MBMS manner, the terminal may start to receive data in an MBMS manner at the target serving cell, and release the unicast bearer for the target serving cell.

According to the method in the embodiments of the present disclosure, the base station exchanges with a further base station the information about the MBSFN areas to which the serving cells of the base stations belong, and transmits the information about the MBSFN areas to which the neighboring cells of the current serving cell of the terminal belong, to the terminal, so that the terminal may acquire the information about the MBSFN areas to which the neighboring cells of the current serving cell belong before the cell switch or reselection. As a result, it is able to create the unicast bearer for the current serving cell or create the unicast bearer or the MBMS service bearer for the target serving cells in advance, thereby to reduce the transmission delay for the group communication service when the terminal moves between the cells, and ensure the continuity of the group communication service.

For ease of better understanding, the methods will be described hereinafter by taking two application scenarios as an example.

Figure 4:
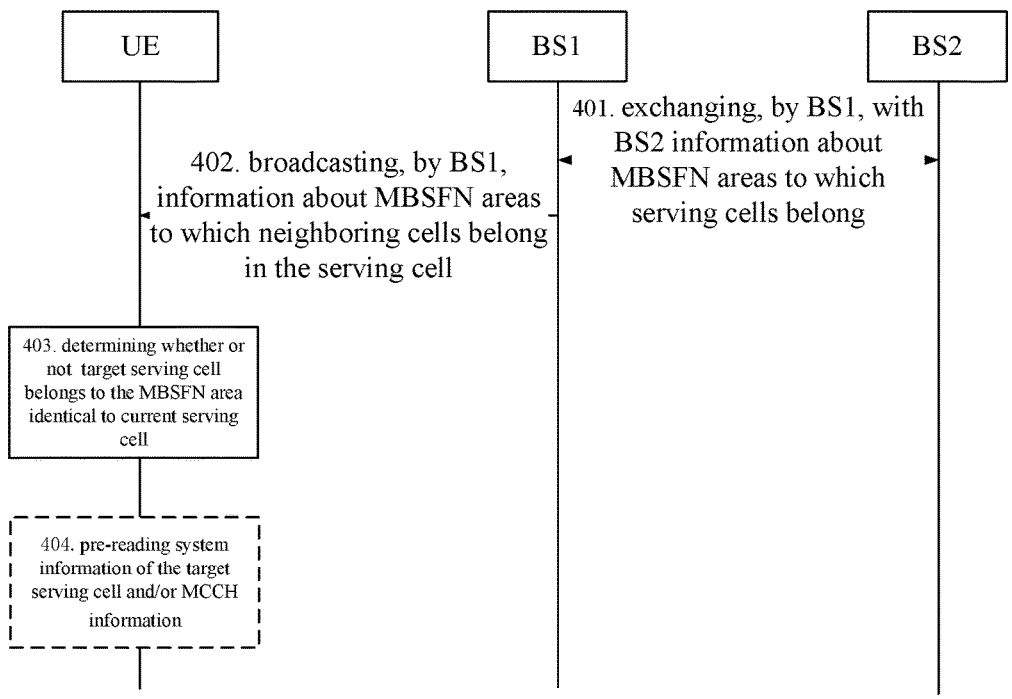
FIG. 4 is a flow chart of a procedure for notifying the group communication information according to one embodiment of the present disclosure.

FIG. 4 shows a procedure for notifying the group communication information in one application scenario. In this application scenario, a base station 1 is a current serving base station of a terminal 1, and a base station 2 may exchange information with the base station 1 via the X2 interface. As shown in FIG. 4, the method may include the following steps.

Step 401: exchanging, by the base station 1, with the base station 2 information about MBSFN areas to which the serving cells of the base stations belong, via a related X2 message, e.g., an X2 Setup Request message, an X2 Setup Response message or an eNB Configuration Update message.

Step 402: broadcasting, by the base station 1, information about MBSFN areas to which neighboring cells of the serving cell of the terminal belong in the serving cell. To be specific, a new SIB may be introduced so as to broadcast the information about the MBSFN areas to which the neighboring cells of the serving cell of the terminal belong. The contents contained in the information about the MBSFN areas are mentioned above, and thus will not be repeated herein.

Alternatively, the base station may notify the information about the MBSFN areas to which the neighboring cells belong by broadcasting only when the neighboring cells belong to the MBSFN areas different from the current serving cell.

Step 403: determining, by the terminal, whether or not the target serving cell belongs to the MBSFN area identical to the current serving cell. The triggering conditions for this step are mentioned hereinbefore, and thus will not be repeated herein.

In Step 403, when the terminal determines that the target serving cell belongs to the MBSFN area identical to the current serving cell, no other operation may be performed by the terminal. Further, when the terminal is currently executing the group communication service, the terminal may continue to receive the group communication data in an MBMS manner. Alternatively, when the terminal determines that the target serving cell belongs to the MBSFN area different from the current serving cell, the terminal may perform the following Step 404.

Step 404: pre-reading, by the terminal, the system information of the target serving cell and/or the MCCH information.

In this step, the terminal may pre-read a Master Information Block (MIB) and/or a SIB of the target serving cell. When it reads SIB13 from the target serving cell, the terminal needs to further read the MCCH information of target serving cell, and determine whether or not there is the group communication service in which the terminal is interested or which is being executed by the terminal in the MBSFN area to which the target serving cell belongs. Further, the following processing may be performed by the terminal in accordance with a determination result.

When there is the group communication service in which the terminal is interested or which is being executed by the terminal, the terminal may continue to receive data in an MBMS manner and meanwhile store one or more of the MIB, SIB and MCCH information of target serving cell. In this way, it is able to receive the data in an MBMS manner as soon as possible when the terminal is switched or reselected to the target serving cell, thereby to ensure the service continuity for the group communication.

When there is no group communication service in which the terminal is interested or which is being executed by the terminal, the terminal may continue to receive data in an MBMS manner, and meanwhile create the unicast bearer for the current serving cell or create the unicast bearer for the target serving cell in accordance with the system information about the target serving cell. In this way, it is able to ensure the transmission delay for the group communication during the cell switch or reselection, thereby to ensure the continuity for the group communication service.

The terminal may determine whether or not there is the group communication service in which the terminal is interested or which is being executed by the terminal in the MBSFN area to which the target serving cell belongs in accordance with a Temporary Mobile Group Identity (TMGI).

Alternatively, prior to Step 402 and subsequent to Step 401, the method further includes a step of determining, by the base station, whether or not there is a terminal in the current serving cell that is interested in the group communication service or that is executing the group communication service. Correspondingly, when it is determined that there is the terminal in the current serving cell that is interested in the group communication service or that is executing the group communication service, it will proceed to Step 402, and otherwise, the procedure will be ended.

Figure 5:
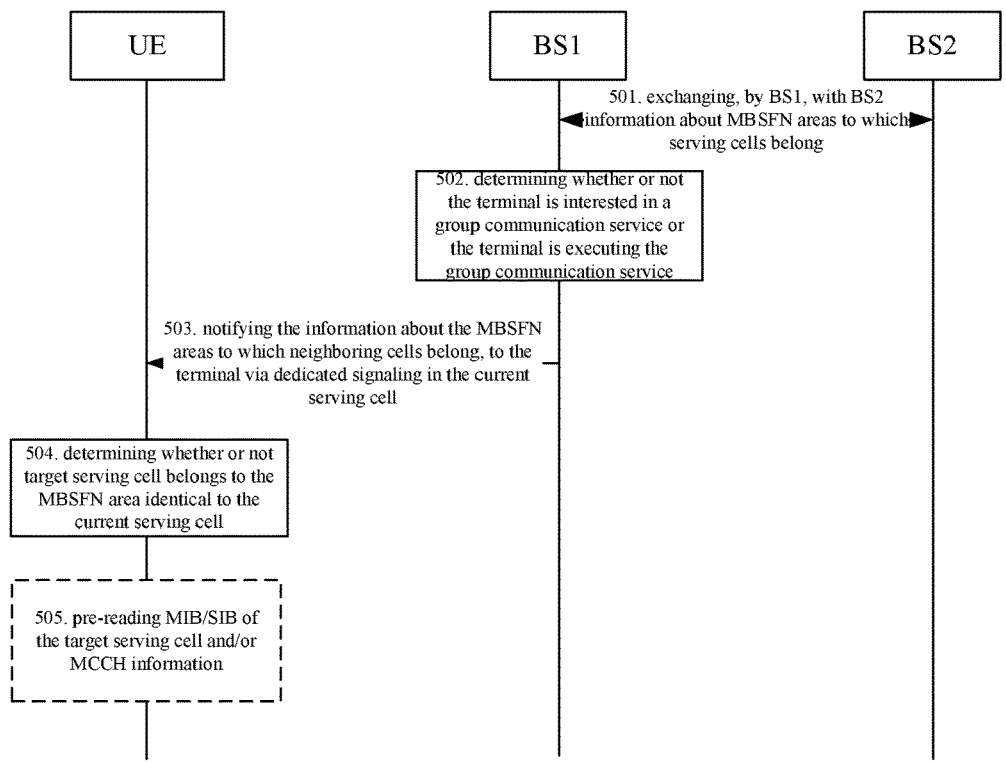
FIG. 5 is another flow chart of the procedure for notifying the group communication information according to one embodiment of the present disclosure.

FIG. 5 shows a procedure for notifying the group communication information in another application scenario. In this application scenario, the base station 1 is the serving base station of the terminal 1, and the base station 2 exchanges information with the base station 1 via an X2 interface. As shown in FIG. 5, the method may include the following steps.

Step 501: exchanging, by the base station 1, with the base station 2 information about MBSFN areas to which serving cells of the base stations belong. In this scenario, the base station 1 may exchange with the base station 2 the information about the MBSFN areas to which the serving cells of the base stations belong via an X2 message, e.g., an X2 Setup Request message, an X2 Setup Response message or an eNB Configuration Update message.

Step 502: determining, by the base station, whether or not the terminal is interested in the group communication service or the terminal is executing the group communication service; when the terminal is interested in the group communication service or the terminal is executing the group communication, proceeding to Step 503, and otherwise, ending the procedure. During the implementation, the base station may determine whether or not the terminal is interested in the group communication service or the terminal is executing the group communication service in accordance with MBMS Interest information reported by the terminal or a counting result.

Step 503: notifying, by the base station, the information about the MBSFN areas to which the neighboring cells of the current serving cell of the terminal belong, to the terminal via dedicated signaling in the current serving cell. During the implementation, the dedicated signal may be RRC signaling, MAC signaling or L1 signaling. The contents contained in the information about the MBSFN areas are mentioned above, and thus will not be repeated herein.

Alternatively, the base station may notify the terminal of the information about the MBSFN areas to which the neighboring cells belong only when the neighboring cells belong to the MBSFN areas different from the current serving cell.

Step 504: determining, by the terminal, whether or not the target serving cell belongs to the MBSFN area identical to the current serving cell. The triggering conditions for this step are mentioned hereinbefore, and thus will not be repeated herein.

In this step, when the terminal determines that the target serving cell belongs to the MBSFN area identical to the current serving cell, no additional operation may be performed. Further, when the terminal is currently executing the group communication service, the terminal may continue to receive the group communication data in an MBMS manner. Alternatively, when the terminal determines that the target serving cell belongs to the MBSFN area different from the current serving cell, Step 505 may be performed.

Step 505: pre-reading, by the terminal, the system information of the target serving cell and/or the MCCH information. This step is identical to Step 404 in FIG. 4, and thus will not be repeated herein.

Figure 6A:
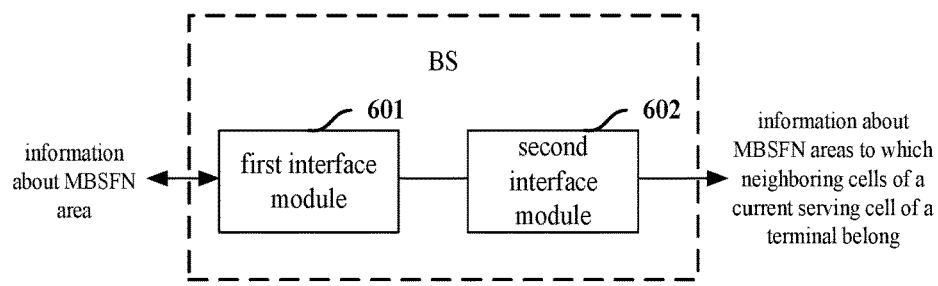
FIGS. 6A, 6B, 6C and 6D are schematic views showing a base station according to one embodiment of the present disclosure.

Based on an identical inventive concept, the present disclosure further provides in some embodiments a base station. As shown in FIG. 6A, the base station may include a first interface module 601 configured to exchange with a further base station information about MBSFN areas to which serving cells of the base stations belong; and a second interface module 602 configured to transmit information about MBSFN areas to which neighboring cells of a current serving cell of a terminal belong, to the terminal in accordance with the neighboring cells of the current serving cell of the terminal and received information about the MBSFN area. The terminal is served by the current serving cell.

To be specific, the first interface module 601 is configured to exchange with a further base station the information about the MBSFN areas to which the serving cells of the base stations belong, by an X2 Setup Request message; or exchange with the further base station the information about the MBSFN area to which the serving cells of the base stations belong, by an X2 Setup Response message; or exchange with the further base station the information about the MBSFN areas to which the serving cells of the base stations belong, by an eNB Configuration Update message.

Figure 6B:
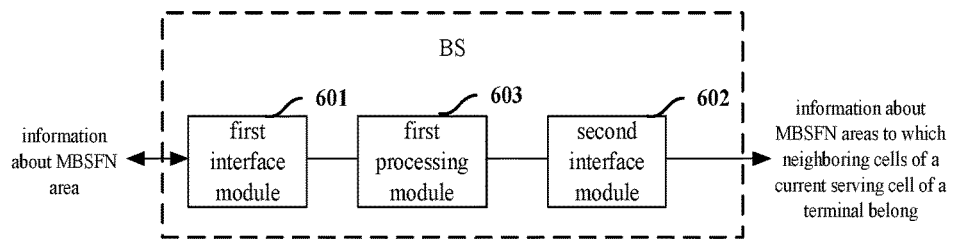

Further, as shown in FIG. 6B, the base station may further include a first processing module 603 configured to determine, in accordance with the neighboring cells of the current serving cell of the terminal and the received information about the MBSFN area, whether or not the MBSFN areas to which the neighboring cells of the current serving cell of the terminal belong are different from the MBSFN area to which the current serving cell of the terminal belongs. Correspondingly, the second interface module 602 may be configured to, when the MBSFN areas to which the neighboring cells of the current serving cell of the terminal belong are different from the MBSFN area to which the current serving cell of the terminal belongs, transmit the information about the MBSFN areas to which the neighboring cells of the current serving cell of the terminal belong, to the terminal.

Figure 6C:
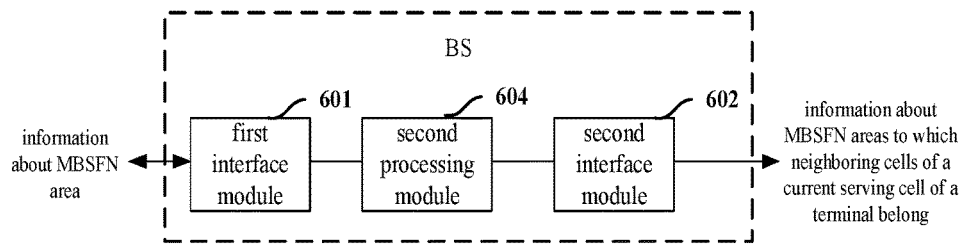

Further, as shown in FIG. 6C, the base station may further include a second processing module 604 configured to determine whether or not the terminal is interested in a group communication service or whether or not the terminal is executing the group communication service after the information about the MBSFN areas has been received by the first interface module 601; and the second interface module 602 is configured to, when the terminal is interested in the group communication service or the terminal is executing the group communication service, transmit the information about the MBSFN areas to which the neighboring cells of the current serving cell of the terminal belong, to the terminal via dedicated signaling. The dedicated signaling includes RRC signaling, MAC signaling or L1 signaling.

Figure 6D:
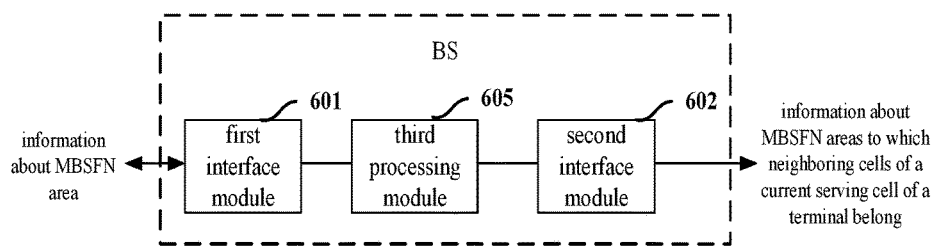

As shown in FIG. 6D, the base station may further include a third processing processor 605 configured to determine whether or not there is a terminal in the current serving cell that is interested in a group communication service or that is executing the group communication service after the information about the MBSFN area has been received by the first interface module 601; and the second interface module 602 is configured to, when there is the terminal in the current serving cell that is interested in the group communication service or that is executing the group communication service, transmit the information about the MBSFN areas to which the neighboring cells of the current serving cell of the terminal belong, to the terminal by broadcasting at the current serving cell the information about the MBSFN areas. The contents contained in the information about the MBSFN areas to which the neighboring cells belong are mentioned hereinbefore, and thus will not be repeated herein.

Figure 7:
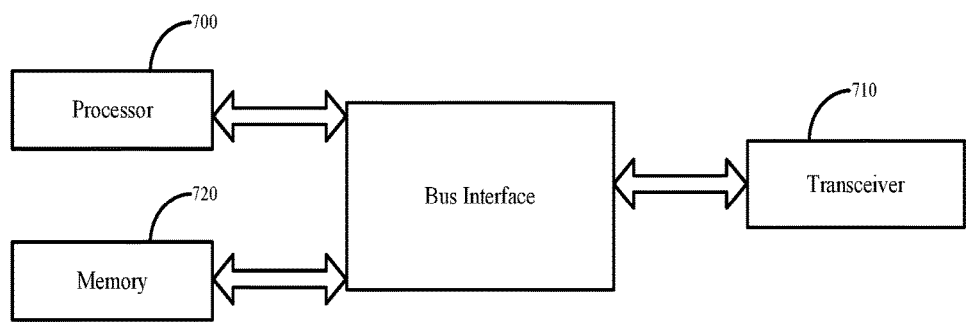
FIG. 7 is another schematic view showing the base station according to one embodiment of the present disclosure.

Based on an identical inventive concept, the present disclosure further provides in some embodiments a base station. As shown in FIG. 7, the base station may include a processor 700, a transceiver 710 and a memory 720.

The processor 700 is configured to read a program stored in the memory 720 so as to exchange with a further base station information about MBSFN areas to which serving cells of the base stations belong, and transmit information about MBSFN areas to which neighboring cells of the current serving cell of the terminal, to the terminal via the transceiver 710 in accordance with the neighboring cells of the current serving cell of the terminal and the information about the MBSFN area received by a first interface module, the terminal being served by the current serving cell. The transceiver 710 is configured to receive and transmit data under the control of the processor 700.

In FIG. 7, a bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. Bus interfaces are provided, and the transceiver 710 may consist of a transmitter and a receiver for communication with any other devices over a transmission medium. The processor 700 takes charge of managing the bus architecture as well general processing. The memory 720 may store data desired for the operation of the processor 700.

Figure 8:
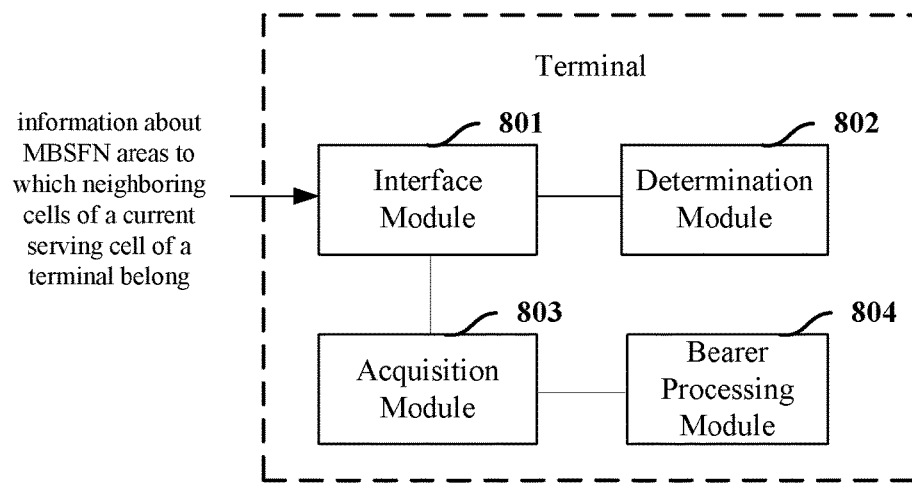
FIG. 8 is a schematic view showing a terminal according to one embodiment of the present disclosure.

Based on an identical inventive concept, the present disclosure further provides in some embodiments a terminal. As shown in FIG. 8, the terminal may include an interface module 801, a determination module 802, an acquisition module 803 and a bearer processing module 804.

The interface module 801 is configured to receive information about MBSFN areas to which neighboring cells of a current serving cell of the terminal belong from a base station. The determination module 802 is configured to determine whether or not target serving cells of the terminal belong to the MBSFN area identical to the current serving cell in accordance with the information about the MBSFN areas received by the interface module.

To be specific, the determination module 802 may be configured to, when the terminal enters the current serving cell, determine whether or not the target serving cells belong to the MBSFN area identical to the current serving cell, the target serving cells being all neighboring cells of the current serving cell; or when signal strength of the current serving cell of the terminal is lower than those of the neighboring cells, determine whether or not the target serving cells belong to the MBSFN area identical to the current serving cell, the target serving cells being the neighboring cells that meet a cell switch or reselection condition, or previous N neighboring cells in the neighboring cells that meet the cell switch or reselection condition when ranked in a descending order in accordance with the signal strength, where N≥1; or when signal quality of the current serving cell of the terminal is less than a first threshold or signal quality of the neighboring cells is greater than a second threshold, determine whether or not the target serving cells belong to the MBSFN area identical to the current serving cell, the target serving cells being the neighboring cells that meet the cell switch or reselection condition, or previous N neighboring cells in the neighboring cells that meet the cell switch or reselection condition when ranked in a descending order in accordance with the signal quality, where N≥1.

Further, the acquisition module 803 is configured to, when the determination module 802 determines that the target serving cells of the terminal belong to the MBSFN areas different from the current serving cell, acquire system information about the target serving cells, and acquire information desired for creating a unicast bearer or an MBMS bearer for the target serving cells in accordance with the system information about the target serving cells.

Further, the acquisition module 803 may be configured to acquire the system information about the target serving cells, acquire multicast control channel information in the system information, and determine whether or not there is a group communication service in which the terminal is interested or which is being executed by the terminal in the MBSFN areas to which the target serving cells belong; when there is the group communication service in which the terminal is interested or which is being executed by the terminal, store the system information about the target serving cells and the multicast control channel information, the system information and the multicast control channel information being used to receive data in an MBMS manner when the terminal is switched or reselected to the target serving cell; or when there is not the group communication service in which the terminal is interested or which is being executed by the terminal, instruct the bearer processing module to create the unicast bearer for the current serving cell, or instruct the bearer processing module to create the unicast bearer for the target serving cell in accordance with the system information about the target serving cell.

Further, the acquisition module 803 may further be configured to, after the terminal is switched to the target serving cell, determine whether or not the group communication service in which the terminal is interested is provided by the target serving cell in an MBMS manner in accordance with the system information about the target serving cell and multicast control channel information, and when the group communication service in which the terminal is interested is provided by the target serving cell in an MBMS manner, instruct the bearer processing module to receive the group communication service at the target serving cell in an MBMS manner, and release the unicast bearer for the target serving cell.

Further, the bearer processing module 804 may be configured to, when the target serving cells of the terminal belong to the MBSFN areas different from the current serving cell, create the unicast bearer for the current serving cell, and switch the terminal to the target serving cell in a unicast manner.

To be specific, the interface module 801 may be configured to receive the information about the MBSFN areas to which the neighboring cells of the current serving cell of the terminal belong from the base station by receiving broadcasting information at the current serving cell or by receiving dedicated signaling. The contents contained in the information about the MBSFN areas to which the neighboring cells belong are mentioned hereinbefore, and thus will not be repeated herein.

Figure 9:
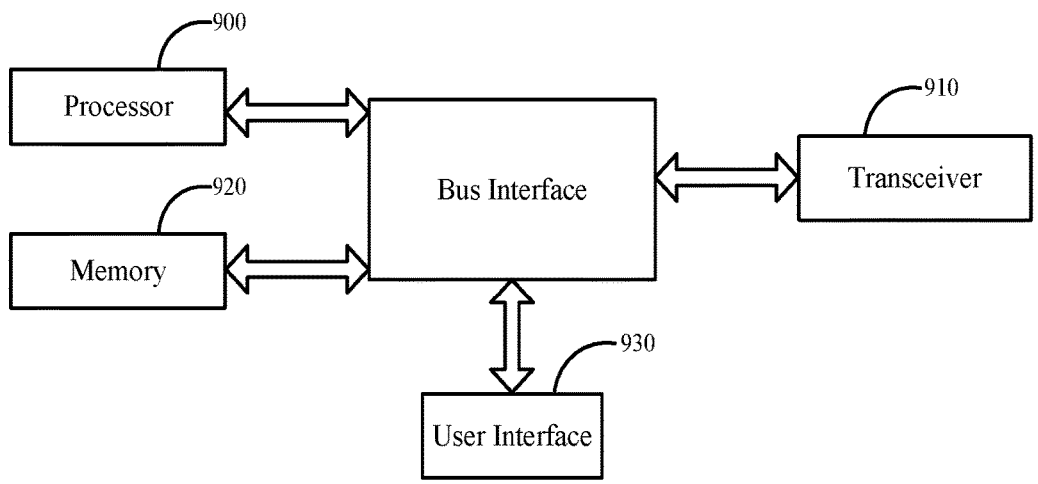
FIG. 9 is another schematic view showing the terminal according to one embodiment of the present disclosure.

Based on an identical inventive concept, the present disclosure further provides in some embodiments a terminal. As shown in FIG. 9, the terminal may include a processor 900, a transceiver 910 and a memory 920. The processor 900 is configured to read a program stored in the memory 920, so as to receive information about MBSFN areas to which neighboring cells of a current serving cell of the terminal belong from a base station via the transceiver 910, and determine whether or not target serving cells of the terminal belong to the MBSFN area identical to the current serving cell in accordance with the received information about the MBSFN areas. The transceiver 910 is configured to receive and transmit data under the control of the processor 900.

In FIG. 9, a bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of a transmitter and a receiver for communication with any other devices over a transmission medium. With respect to different User Equipments (UEs), a user interface 930 may also be provided for devices which are to be arranged inside or outside each UE, and these devices may include but not limited to a keypad, a display, a speaker, a microphone and a joystick. The processor 900 takes charge of managing the bus architecture as well general processing. The memory 920 may store data desired for the operation of the processor 900.

In a word, the present disclosure provides in the embodiments the method on the basis of the existing LTE network architecture, so as to reduce the transmission delay for the group communication. Through the method, it is able to, without changing the existing network architecture, reduce the transmission delay for the group communication service during the movement of the terminal, thereby to meet the requirements of the group communication service on continuity.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processing implemented by the computer, thereby to provide the steps capable of effecting the functions specified one or more processes in the flow charts and/or one or more blocks in the block diagrams in accordance with the instructions.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A method for notifying group communication information, comprising:
   exchanging, by a base station, with a further base station, information about Multicast Broadcast Single Frequency Network (MBSFN) areas to which serving cells of the base stations belong; and
   transmitting, by the base station, the information about the MBSFN areas to which the neighboring cells of a current serving cell of a terminal belong, to the terminal in accordance with the neighboring cells of the current serving cell of the terminal and the received information about the MBSFN area,
   wherein the transmitting, by the base station, the information about the MBSFN areas to which the neighboring cells of the current serving cell of the terminal belong, to the terminal in accordance with the neighboring cells of the current serving cell of the terminal and the received information about the MBSFN area comprises:
   determining, by the base station, whether or not the terminal is interested in a group communication service or whether or not the terminal is executing the group communication service after the information about the MBSFN areas has been received; and transmitting, by the base station, the information about the MBSFN areas to which the neighboring cells of the current serving cell of the terminal belong, to the terminal via dedicated signaling, when the base station determines that the terminal is interested in the group communication service or the terminal is executing the group communication service, wherein the dedicated signaling comprises Radio Resource Control (RRC) signaling, Media Access Control (MAC) signaling or L1 signaling, or wherein the transmitting, by the base station, the information about the MBSFN areas to which the neighboring cells of the current serving cell of the terminal belong, to the terminal in accordance with the neighboring cells of the current serving cell of the terminal and the received information about the MBSFN areas comprises:

determining, by the base station, whether or not there is a terminal in the current serving cell that is interested in a group communication service or that is executing the group communication service after the information about the MBSFN area has been received; and transmitting the information about the MBSFN areas to which the neighboring cells of the current serving cell of the terminal belong, to the terminal by broadcasting at the current serving cell the information about the MBSFN areas, when the base station determines that there is a terminal in the current serving cell that is interested in the group communication service or that is executing the group communication service.

2. The method according to claim 1, wherein the exchanging of, by the base station, with the further base station, the information about the MBSFN areas to which the serving cells of the base stations belong comprises:

exchanging, by the base station, with the further base station the information about the MBSFN areas to which the serving cells of the base stations belong, by an X2 Setup Request message; or exchanging, by the base station, with the further base station the information about the MBSFN areas to which the serving cells of the base stations belong, by an X2 Setup Response message; or exchanging, by the base station, with the further base station the information about the MBSFN areas to which the serving cells of the base stations belong, by an evolved NodeB (eNB) Configuration Update message.

3. The method according to claim 1, wherein the information about the MBSFN areas to which the neighboring cells belong comprises one or a combination of:

identifiers of all the neighboring cells, and identifiers of the MBSFN areas to which the neighboring cells belong;

identifiers of all the neighboring cells, and indication information corresponding to the identifier of each neighboring cell, wherein the indication information indicates whether or not each neighboring cell belongs to the MBSFN area identical to the current serving cell;

identifiers of the neighboring cells which belong to the MBSFN areas different from the current serving cell, and identifiers of the MBSFN areas to which these neighboring cells belong;

identifiers of the neighboring cells which belong to the MBSFN areas different from the current serving cell; and identifiers of the neighboring cells which belong to the MBSFN areas identical to the current serving cell.

4. The method according to claim 1, wherein the transmitting of, by the base station, the information about the MBSFN areas to which the neighboring cells of the current serving cell of the terminal belong, to the terminal in accordance with the neighboring cells of the current serving cell of the terminal and the received information about the MBSFN area comprises:

transmitting, by the base station, the information about the MBSFN areas to which the neighboring cells of a current serving cell of a terminal belong, to the terminal when the base station determines, in accordance with the neighboring cells of the current serving cell of the terminal and the received information about the MBSFN area, that the MBSFN areas to which the neighboring cells of the current serving cell of the terminal belong are different from the MBSFN area to which the current serving cell of the terminal belongs, wherein the terminal is served by the current serving cell.

5. A method for notifying group communication information, comprising:

receiving, by a terminal, information about Multicast Broadcast Single Frequency Network (MBSFN) areas to which neighboring cells of a current serving cell of the terminal belong from a base station;

determining, by the terminal, whether or not target serving cells of the terminal belong to the MBSFN area identical to the current serving cell in accordance with the received information about the MBSFN areas; and acquiring, by the terminal, system information about the target serving cells, so as to acquire information used for creating a unicast bearer or the Multimedia Broadcast Multicast Service (MBMS) bearer for the target serving cells in accordance with the system information about the target serving cells, in the case that the MBSFN areas to which the neighboring cells of the current serving cell of the terminal belong are different from the MBSFN area to which the current serving cell of the terminal belongs, wherein the acquiring of, by the terminal, the system information about the target serving cells, and acquiring the information desired for creating a unicast bearer or an MBMS bearer for the target serving cells in accordance with the system information about the target serving cells comprises:

acquiring, by the terminal, the system information about the target serving cells, acquiring Multicast Control Channel (MCCH) information in the system information, and determining whether or not there is a group communication service in which the terminal is interested or which is being executed by the terminal in the MBSFN areas to which the target serving cells belong;

storing the system information about the target serving cells and the MCCH information, when there is the group communication service in which the terminal is interested or which is being executed by the terminal, wherein the system information and the multicast control channel information are used to receive data in an MBMS manner when the terminal is switched or reselected to the target serving cells; or creating the unicast bearer for the current serving cell, or creating the unicast bearer for the target serving cells in accordance with the system information about the target serving cells, when there is not the group communication service in which the terminal is interested or which is being executed by the terminal, wherein when the terminal determines that the target serving cells of the terminal belong to the MBSFN areas different from the current serving cell, the method further comprises:

creating, by the terminal, the unicast bearer for the current serving cell so as to be switched to the target serving cells in a unicast manner, wherein after the terminal is switched to the target serving cells, the method further comprises:

determining, by the terminal, whether or not the group communication service in which the terminal is interested is provided by the target serving cells in a Multimedia Broadcast Multicast Service (MBMS) manner in accordance with the system information about the target serving cells and the MCCH information; and receiving the group communication service at the target serving cells in an MBMS manner, and releasing the unicast bearer for the target serving cells, when the group communication service in which the terminal is interested is provided by the target serving cells in an MBMS manner, wherein the receiving of, by the terminal, the information about the MBSFN areas to which the neighboring cells of the current serving cell of the terminal belong from the base station comprises:

receiving, by the terminal, the information about the MBSFN areas to which the neighboring cells of the current serving cell of the terminal belong from the base station by receiving broadcasting information at the current serving cell or by receiving dedicated signaling.

6. The method according to claim 5, wherein the determining of, by the terminal, whether or not the target serving cells of the terminal belong to the MBSFN area identical to the current serving cell comprises:

determining whether or not the target serving cells belong to the MBSFN area identical to the current serving cell, when the terminal enters the current serving cell, wherein the target serving cells are all neighboring cells of the current serving cell; or determining whether or not the target serving cells belong to the MBSFN area identical to the current serving cell, when signal strength of the current serving cell of the terminal is lower than those of the neighboring cells, wherein the target serving cells are the neighboring cells that meet a cell switch or reselection condition, or previous N neighboring cells in the neighboring cells that meet the cell switch or reselection condition when ranked in a descending order in accordance with the signal strength, where $N \geq 1$; or determining whether or not the target serving cells belong to the MBSFN area identical to the current serving cell, when signal quality of the current serving cell of the terminal is less than a first threshold or signal quality of the neighboring cells is greater than a second threshold, wherein the target serving cells are the neighboring cells that meet the cell switch or reselection condition, or previous N neighboring cells in the neighboring cells that meet the cell switch or reselection condition when ranked in a descending order in accordance with the signal quality, where $N \geq 1$.

7. The method according to claim 5, wherein the information about the MBSFN areas to which the neighboring cells belong comprises one or a combination of:

identifiers of all the neighboring cells, and identifiers of the MBSFN areas to which the neighboring cells belong;

identifiers of all the neighboring cells, and indication information corresponding to the identifier of each neighboring cell, wherein the indication information indicates whether or not each neighboring cell belongs to the MBSFN area identical to the current serving cell;

identifiers of the neighboring cells which belong to the MBSFN areas different from the current serving cell, and identifiers of the MBSFN areas to which these neighboring cells belong;

identifiers of the neighboring cells which belong to the MBSFN areas different from the current serving cell; and identifiers of the neighboring cells which belong to the MBSFN areas identical to the current serving cell.

8. A base station, comprising:

a processor;

a hardware memory, which is connected with the processor via a bus interface and is configured to store program and data used for the processor;

a transceiver, which is configured to communicate with other devices through transmission media, when the processor calls and executes the program and data stores in the hardware memory, the base station is configured to:

exchange with a further base station information about Multicast Broadcast Single Frequency Network (MBSFN) areas to which serving cells of the base stations belong; and transmit the information about the MBSFN areas to which neighboring cells of a current serving cell of a terminal belong, to the terminal in accordance with the neighboring cells of the current serving cell of the terminal and the received information about the MBSFN area, wherein the base station is further configured to determine whether or not the terminal is interested in a group communication service or whether or not the terminal is executing the group communication service after the information about the MBSFN areas has been received by the first interface module, wherein the base station is configured to, when the terminal is interested in the group communication service or the terminal is executing the group communication service, transmit the information about the MBSFN areas to which the neighboring cells of the current serving cell of the terminal belong, to the terminal via dedicated signaling, wherein the dedicated signaling comprises Radio Resource Control (RRC) signaling, Media Access Control (MAC) signaling or L1 signaling, or wherein the base station is further configured to determine whether or not there is a terminal in the current serving cell that is interested in a group communication service or that is executing the group communication service after the information about the MBSFN area has been received by the first interface module, wherein the base station is configured to, when the base station determines that there is a terminal in the current serving cell that is interested in the group communication service or that is executing the group communication service, broadcast at the current serving cell the information about the MBSFN areas to which the neighboring cells of the current serving cell of the terminal belong.

9. The base station according to claim 8, wherein the base station is configured to exchange with the further base station the information about the MBSFN areas to which the serving cells of the base stations belong, by an X2 Setup Request message, or exchange with the further base station the information about the MBSFN area to which the serving cells of the base stations belong, by an X2 Setup Response message, or exchange with the further base station the information about the MBSFN areas to which the serving cells of the base stations belong, by an evolved NodeB (eNB) Configuration Update message.

10. The base station according to claim 8, wherein the information about the MBSFN areas to which the neighboring cells belong includes one or a combination of:
    identifiers of all the neighboring cells, and identifiers of the MBSFN areas to which the neighboring cells belong;
    identifiers of all the neighboring cells, and indication information corresponding to the identifier of each neighboring cell, wherein the indication information indicates whether or not each neighboring cell belongs to the MBSFN area identical to the current serving cell;
    identifiers of the neighboring cells which belong to the MBSFN areas different from the current serving cell, and identifiers of the MBSFN areas to which these neighboring cells belong;
    identifiers of the neighboring cells which belong to the MBSFN areas different from the current serving cell; and
    identifiers of the neighboring cells which belong to the MBSFN areas identical to the current serving cell.

11. The base station according to claim 8, wherein the base station is further configured to determine, in accordance with the neighboring cells of the current serving cell of the terminal and the received information about the MBSFN area, whether or not the MBSFN areas to which the neighboring cells of the current serving cell of the terminal belong are different from the MBSFN area to which the current serving cell of the terminal belongs,
    wherein the base station is further configured to, when the MBSFN areas to which the neighboring cells of the current serving cell of the terminal belong are different from the MBSFN area to which the current serving cell of the terminal belongs, transmit the information about the MBSFN areas to which the neighboring cells of the current serving cell of the terminal belong, to the terminal.

12. A terminal, comprising:
a processor;
a hardware memory, which is connected with the processor via a bus interface and is configured to store program and data used for the processor;
a transceiver, which is configured to communicate with other devices through transmission media,
when the processor calls and executes the program and data stores in the hardware memory, the terminal is configured to:
receive information about Multicast Broadcast Single Frequency Network (MBSFN) areas to which neighboring cells of a current serving cell of the terminal belong from a base station;
determine whether or not target serving cells of the terminal belong to the MBSFN area identical to the current serving cell in accordance with the information about the MBSFN areas; and
acquiring system information about the target serving cells, so as to acquire information used for creating a unicast bearer or the Multimedia Broadcast Multicast Service (MBMS) bearer for the target serving cells in accordance with the system information about the target serving cells, in the case that the MBSFN areas to which the neighboring cells of the current serving cell of the terminal belong are different from the MBSFN area to which the current serving cell of the terminal belongs,
wherein the terminal is further configured to:
acquire the system information about the target serving cells, acquire Multicast Control Channel (MCCH) information in the system information, and determine whether or not there is a group communication service in which the terminal is interested or which is being executed by the terminal in the MBSFN areas to which the target serving cells belong; and
when there is the group communication service in which the terminal is interested or which is being executed by the terminal, store the system information about the target serving cells and the multicast control channel information, wherein the system information and the multicast control channel information are used to receive data in an MBMS manner when the terminal is switched or reselected to the target serving cells; or
when there is not the group communication service in which the terminal is interested or which is being executed by the terminal, instruct the bearer processing module to create the unicast bearer for the current serving cell, or instruct the bearer processing module to create the unicast bearer for the target serving cells in accordance with the system information about the target serving cells,
wherein the terminal further comprising a bearer processing module configured to when the target serving cells of the terminal belong to the MBSFN areas different from the current serving cell, create the unicast bearer for the current serving cell, and switch the terminal to the target serving cells in a unicast manner,
wherein the terminal is further configured to:
after the terminal is switched to the target serving cells, determine whether or not the group communication service in which the terminal is interested is provided by the target serving cells in an MBMS manner in accordance with the system information about the target serving cells and the MCCH information, and
when the group communication service in which the terminal is interested is provided by the target serving cells in an MBMS manner, instruct the bearer processing module to receive the group communication service at the target serving cells in an MBMS manner, and release the unicast bearer for the target serving cells,
wherein the terminal is configured to receive the information about the MBSFN areas to which the neighboring cells of the current serving cell of the terminal belong from the base station by receiving broadcasting information at the current serving cell or by receiving dedicated signaling.

13. The terminal according to claim 12, wherein the terminal is configured to:
when the terminal enters the current serving cell, determine whether or not the target serving cells belong to the MBSFN area identical to the current serving cell, wherein the target serving cells are all neighboring cells of the current serving cell; or
when signal strength of the current serving cell of the terminal is lower than those of the neighboring cells, determine whether or not the target serving cells belong to the MBSFN area identical to the current serving cell, wherein the target serving cells are the neighboring cells that meet a cell switch or reselection condition, or previous N neighboring cells in the neighboring cells that meet the cell switch or reselection condition when ranked in a descending order in accordance with the signal strength, where $N \geq 1$; or when signal quality of the current serving cell of the terminal is less than a first threshold or signal quality of the neighboring cells is greater than a second threshold, determine whether or not the target serving cells belong to the MBSFN area identical to the current serving cell, wherein the target serving cells are the neighboring cells that meet the cell switch or reselection condition, or previous N neighboring cells in the neighboring cells that meet the cell switch or reselection condition when ranked in a descending order in accordance with the signal quality, where $N \geq 1$.

14. The terminal according to claim 12, wherein the information about the MBSFN areas to which the neighboring cells belong comprises one or a combination of:

identifiers of all the neighboring cells, and identifiers of the MBSFN areas to which the neighboring cells belong;

identifiers of all the neighboring cells, and indication information corresponding to the identifier of each neighboring cell, wherein the indication information indicates whether or not each neighboring cell belongs to the MBSFN area identical to the current serving cell;

identifiers of the neighboring cells which belong to the MBSFN areas different from the current serving cell, and identifiers of the MBSFN areas to which these neighboring cells belong;

identifiers of the neighboring cells which belong to the MBSFN areas different from the current serving cell; and identifiers of the neighboring cells which belong to the MBSFN areas identical to the current serving cell.

* * * * *